United States Patent [19]

Vulliez

[11] Patent Number: 5,161,691
[45] Date of Patent: Nov. 10, 1992

[54] PROTECTED FOOD UTENSILS

[76] Inventor: Henri Vulliez, Moulin de Butteaux - Flogny-la-Chapelle, 89360 Butteaux, France

[21] Appl. No.: 641,535

[22] Filed: Jan. 15, 1991

[30] Foreign Application Priority Data

Jan. 18, 1990 [FR] France .................. 90 00961
Apr. 11, 1990 [FR] France .................. 90 04674

[51] Int. Cl.⁵ .............. B65B 5/04; B65D 17/24; B65D 69/00
[52] U.S. Cl. .................. 206/553; 53/410; 53/450; 206/542; 30/142; 30/323; 76/105; 76/DIG. 7
[58] Field of Search ........... 76/104.1, 105, DIG. 7; 53/410, 450, 553; 30/323, 322, 142, 147, 148, 149, 150; 294/56, 61; 206/553, 542; 383/200

[56] References Cited

U.S. PATENT DOCUMENTS

| | | | |
|---|---|---|---|
| 234,633 | 11/1880 | Way | 294/56 X |
| 2,773,530 | 12/1956 | Sullivan | 30/322 X |
| 3,664,020 | 5/1972 | Hammond et al. | 30/142 |
| 3,675,323 | 7/1972 | Braginetz . | |
| 4,138,014 | 2/1979 | Bouman | 206/542 |
| 4,204,824 | 5/1980 | Paradis . | |
| 4,544,519 | 10/1985 | Schilke . | |
| 4,582,353 | 4/1986 | Alvernhe . | |
| 4,814,134 | 3/1989 | Brown . | |
| 4,896,424 | 1/1990 | Walker | 76/104.1 X |

FOREIGN PATENT DOCUMENTS

| | | |
|---|---|---|
| EP182514 A1 | 5/1986 | European Pat. Off. . |
| EP218101 A1 | 4/1987 | European Pat. Off. . |
| 447697 | 1/1913 | France .................. 76/105 |
| 1264265 | 5/1961 | France . |
| 2254419 | 7/1975 | France . |
| 11652 | of 1911 | United Kingdom .......... 76/105 |
| 256464 | 8/1926 | United Kingdom .......... 76/105 |
| 2187989 | 9/1987 | United Kingdom . |

OTHER PUBLICATIONS

G. R. Langecker, "Automatisierungen im Spritzgiessbetrieb", Oct. 10, 1983, Kunstsoffe, vol. 73 pp. 559-563.
"Automatisierungen im Spritzgiessen und Verpacken von Bestecken", Feb. 2, 1989, Kunststoffe, vol. 79, p. 136.
P. Spamer, et al.,: "Flexibles Fertigungszentrum fur das Spritzgiessen . . . ", Sep. 9, 1984, Kunststoffe, vol. 74, pp. 489-490.

Primary Examiner—Horace M. Culver
Attorney, Agent, or Firm—Ostrolenk, Faber, Gerb & Soffen

[57] ABSTRACT

A device for protecting articles comprising a plate-shaped protective member connected directly to at least one sharp-pointed portion of the article to be protected by at least one frangible point so as to separate the protecting member from the article before using the latter.

6 Claims, 3 Drawing Sheets

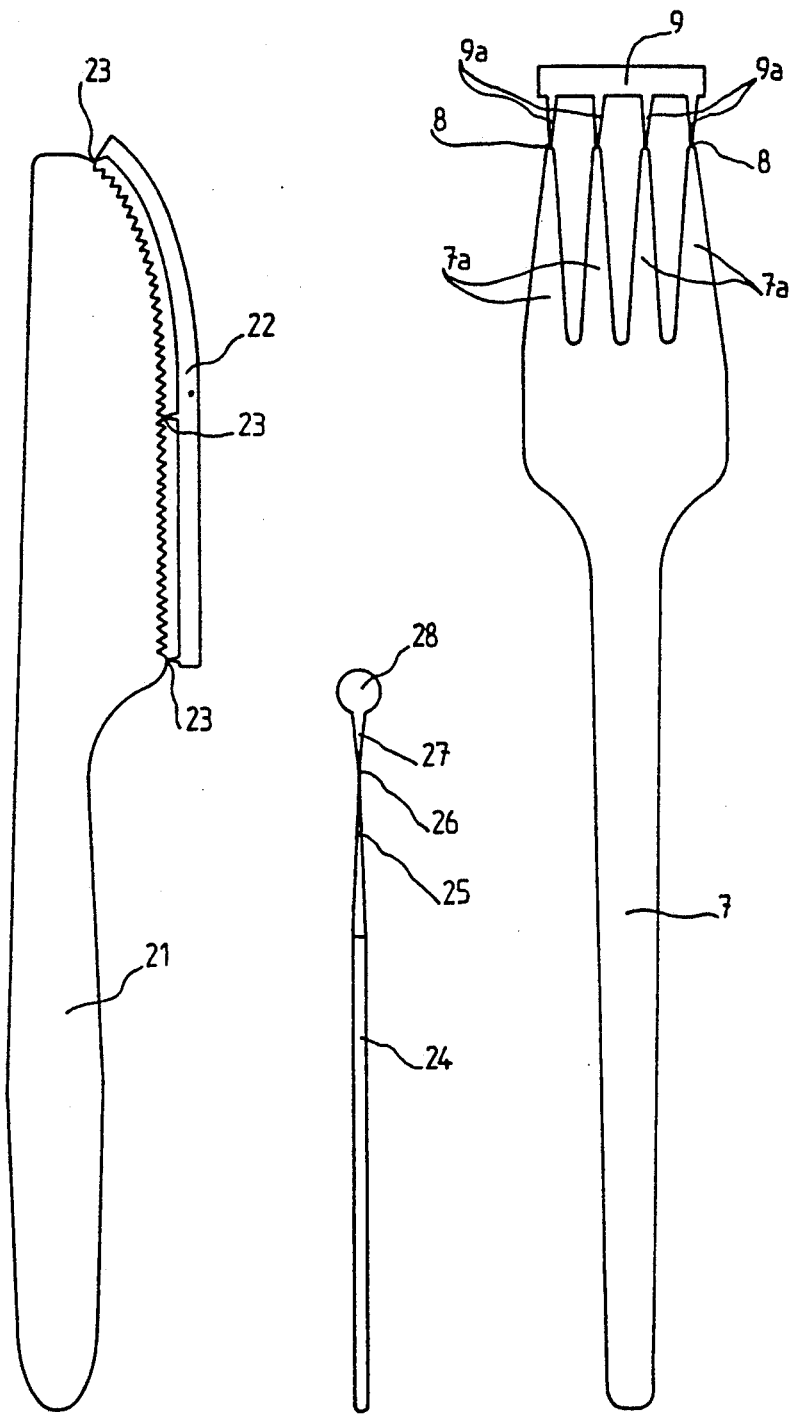

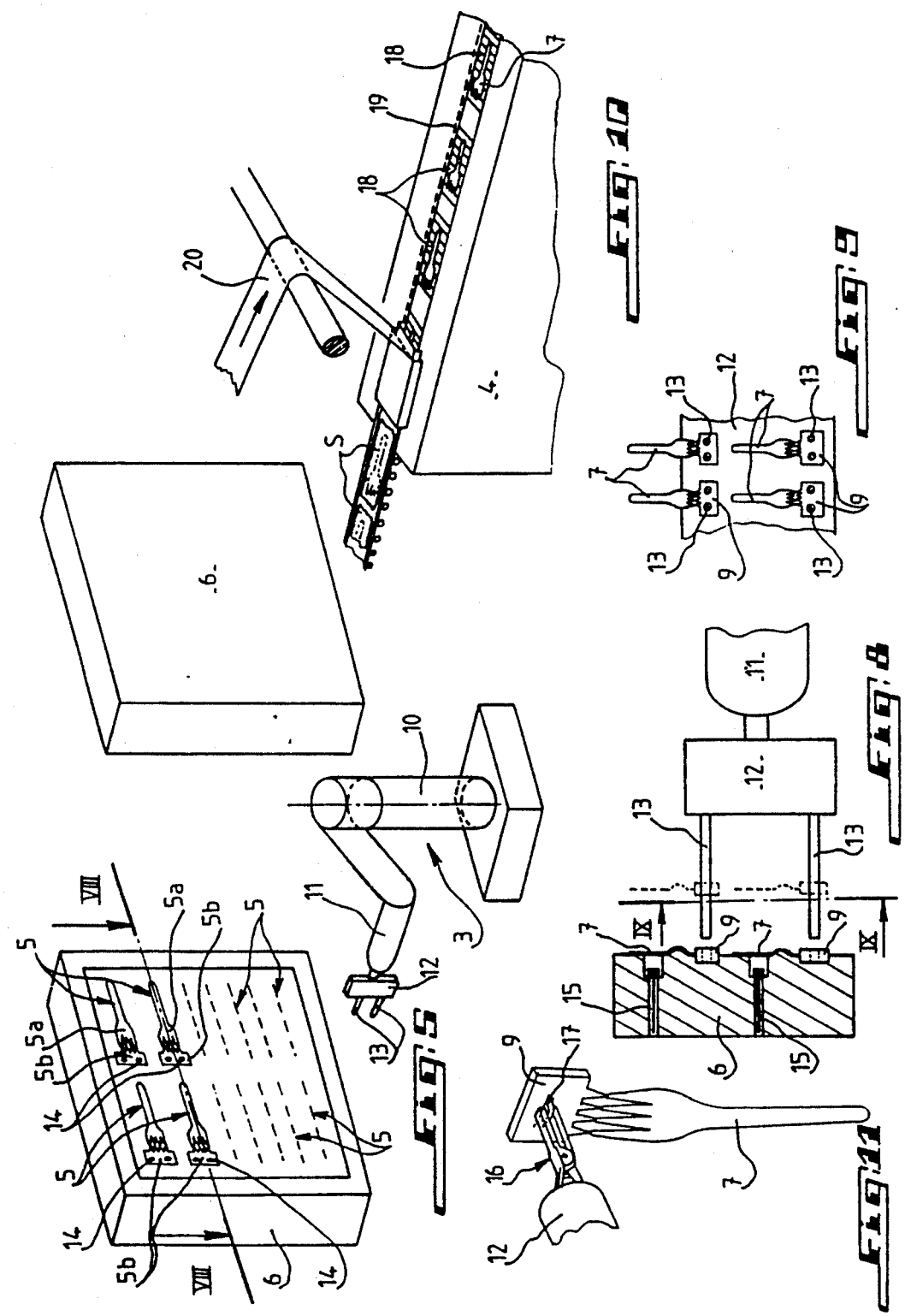

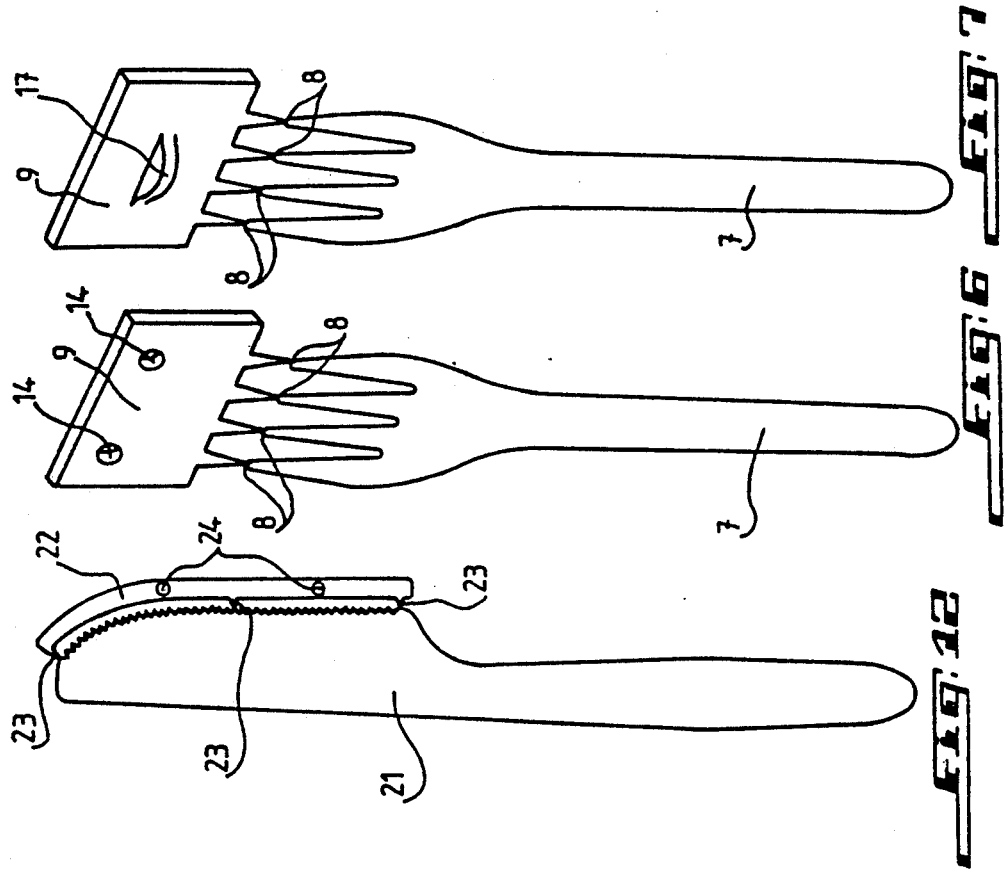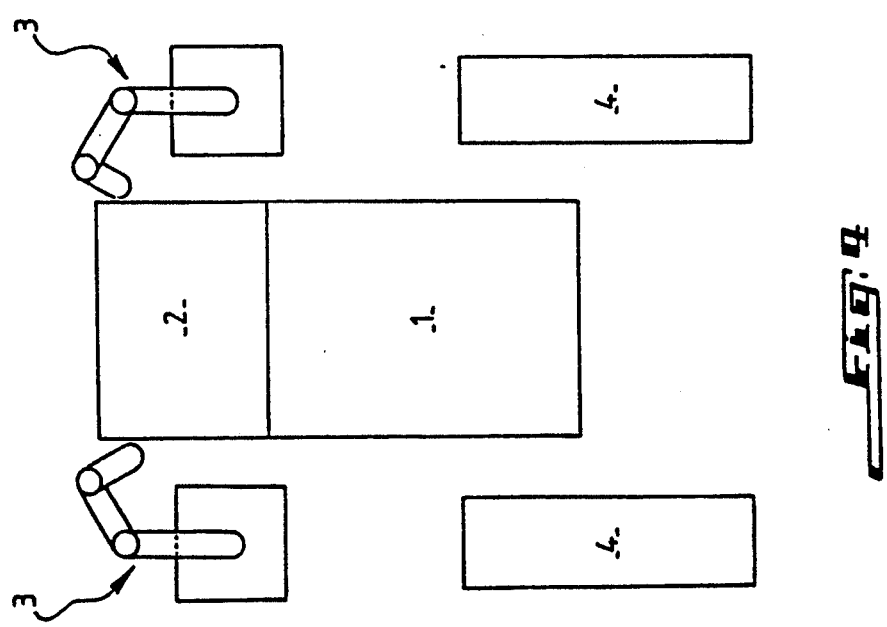

PROTECTED FOOD UTENSILS

BACKGROUND OF THE INVENTION

1. Field of the Invention

The present invention relates essentially to protected articles of manufacture, especially, protected disposable food utensils, such as forks, knives, spoons, hors-d'oeuvre skewers, which are normally used once only.

2. Description of the Related Art

Forks, knives and spoons are presently supplied in a state without any protection against cuts or gashes or pricks which they may cause and especially without any guarantee that they have not been used previously. This also holds true for forks, knives and spoons packed in bags since nothing would guarantee that they have not already been used previously once they have been taken out of their respective bags.

SUMMARY OF THE INVENTION

An object of the present invention is to provide protected articles of manufacture less likely to cause pricks, cuts, or gashes, and capable of providing visible assurance they it has not been previously used.

In accordance with the invention, a protected article is provided comprising a food utensil having at least one sharp region and a protecting member frangibly joined to said sharp region, wherein said protecting member blocks access to said sharp region.

In the case where the article is an hors-d'oeuvre skewer such as a pin, or needle, the protecting member has the shape of a ball connected to the sharp-pointed portion of the pin or needle by a narrowed protrusion which frangibly joins the article.

In the case where the article is a fork, the protective member has the shape of a strip connected to the tips of the prongs of the fork by a plurality of narrowed protrusions, each of which frangibly joins the tip of a prong of said fork.

In the case where the article is a knife, the protective member has the shape of a strip connected to the cutting edge of the knife by at least one narrowed protrusion frangibly joined to said cutting edge.

Each article, including the food utensil, its protecting member and any protrusion joining the utensil to the protecting member, are made in one single piece by injection or compression molding.

The articles are made from a plastics material.

The invention is also directed to a device for handling molded articles of manufacture for use in particular with foodstuffs such as forks or knives for conditioning them into protective wrappings (e.g. bags and the like).

Such articles are presently obtained through molding of a plastics material such as polypropylene, polystyrene or polycarbonate injected into corresponding cavities or impressions of a metal mold of the hot-runner type and with a parting plane of both parts of the vertical mold. Thus, after each opening of both parts of the mold, the molded articles are ejected simultaneously from their molding cavities and fall down into a receiving or collecting container wherefrom they are then recovered for being conditioned by hand or automatically into protective bags.

However, when falling in bulk into the receiving container, the articles (especially forks) would often become entangled with each other. The operator then incurred the risk of breaking prongs of some articles which would result in rejects. Moreover, the disentanglement of the articles would delay their being packed into bags.

The object of the present invention is to cope with the above-mentioned inconveniences by providing a device for the handling of molded articles for use in particular with food products, such as forks or knives, for conditioning them into protective bags and characterized in that it comprises gripping means adapted to separately grip the molded articles prior to or upon their ejection from the mold and to convey or carry them towards an automatic machine for packing the articles into the protecting bags.

In one embodiment of the invention, each molded article comprises a part for the protection of the active or operative portion of the article removably connected thereto through at least one frangible point. The protective part comprises at least one means allowing the aforesaid gripping means to grasp the article.

Preferably, the aforesaid gripping means comprises at least one robot with an arm and wrist for gripping the molded articles.

According to one embodiment, the aforesaid robot wrist comprises pliers or nippers for grasping the articles (before their ejection from the mold) by a molded protrusion of the protective member.

According to another embodiment, the aforesaid robot wrist comprises parallel gripping rods for insertion into openings of the protective members. The rods thus grip the articles upon their ejection from the mold.

Preferably, each protective member comprises two openings to be threaded onto two gripping rods, respectively.

Advantageously, the gripping means comprises two like robots, each with a plurality of arms and wrists, for successively gripping two groups of molded articles. One of the robots conveys one gripped group of molded articles towards a packing machine, while the other robot grips another group of molded articles.

Each aforesaid robot is adapted through pivoting to penetrate between both parts of the mold with a vertical parting plane for grasping the molded articles and to disengage itself from these two parts in order to carry the articles toward the packing machine.

The aforesaid gripping means convey the gripped molded articles to a storage station where they are again gripped by other gripping means, preferably a robot with a gripping arm and wrist, in order to be brought to the packing machine where they are conditioned, separately or together with others, into protective bags.

Advantageously, each protective bag is heat-sealed to the protective member of the article by ultrasounds or by high frequency.

Each protective member consists of a plate connected to the active or operative portion of the molded article by hammered-out portions.

BRIEF DESCRIPTION OF THE DRAWINGS

The invention will be better understood and further objects and details will appear from the following detailed description and reference to the accompanying drawings given by way of non-limiting examples.

FIG. 1 shows a fork provided with a protective member according to the invention.

FIG. 2 shows a knife also provided with a protective member according to the invention.

FIG. 3 shows a pin or needle for hors-d'oeuvres provided with a protective member according to the invention.

FIG. 4 is a general diagram of a plant for the molding of articles and for their automatic handling and packing into protective bags.

FIG. 5 is a perspective view showing gripping means associated with an open mold for gripping molded articles, only the cavities of the mold being shown.

FIG. 6 shows as an enlarged view, a fork to which is connected a protective plate according to a first embodiment.

FIG. 7 is a view like that of FIG. 6, but showing a second embodiment of the protective plate.

FIG. 8 is a view in cross-section taken upon the line VIII—VIII of FIG. 5.

FIG. 9 is a view in cross-section taken upon the line IX—IX of FIG. 8.

FIG. 10 is a partial perspective view of a packing machine.

FIG. 11 shows another embodiment of a means for gripping molded articles.

FIG. 12 shows a knife as a molded article which may be grasped by gripping means according to the invention.

DETAILED DESCRIPTION OF THE PREFERRED EMBODIMENTS

FIG. 1 shows a fork 7 made from a molded plastics material, for example, polystyrene, polypropylene or polycarbonate. The prongs 7a are connected at their ends to teeth 9a of a protective member 9 shaped as a strip or plate made from a plastics material like that forming the fork 7. The plate 9 comprises teeth 9a located on a same side, and the tips or ends of teeth 9a which are made fast to the tips of prongs 7a of fork 7. Thus, plate 9 is connected to prongs 7a of fork 7 by narrowed points forming frangible points so that this plate may be separated or severed by a user by breaking the connection between the teeth 9a and the prongs 7a. Under such circumstances, plate 9 would not only protect a user from being pricked by prongs 7a of fork 7, but also evidences the lack of a prior use of the fork since the plate 9 would normally have been disconnected from fork 7 if it had been previously used.

The same results are obtained with the knife and the pin or needle shown on FIGS. 2 and 3, respectively.

On FIG. 2, the knife 21 has its keen or cutting edge protected by strip 22 conforming to the shape of the cutting edge and connected thereto by two or more teeth-shaped frangible connections 23 forming narrowed points frangibly connected to knife 21. The knife 21 and the strip 22 are made from the same plastics material.

The pin or needle 24 shown on FIG. 3 has its sharp-pointed tip 25 connected by a narrowed point 26 to the sharp-pointed end of a tapered portion 27 made fast to a protecting ball 28. The pin or needle 24 and the protecting ball 28 are made from the same plastics material.

The above-mentioned articles are made in one single piece in a single mold as explained below.

The junction point(s) between the article and its associated protective member is or are therefore narrowed near the frangible junction to facilitate their breakage when using the article. The non-use of this article is therefore evidenced by lack of breakage of the frangible junctions. Breakage of at least one of the junction points advises the user that the article could already have been used and that he would rather refrain from using it for the sake of his health.

FIG. 4 shows diagrammatically an example of a plant for mold articles such as food utensils, gripping and removing them from their mold, and conditioning them automatically into protective bags. The plant allows these operating steps to proceed at a very high rate and comprises a machine 1 for plasticizing and injecting a plastics material (e.g. polystyrene, polypropylene or polycarbonate) into a metal mold 2 with cavities or impressions which correspond to the shapes of the article to be molded. Two like robots 3 arranged on either side of the machine 1 - and - mold 2 unit for grasping in turn the molded articles from mold 2 and carrying them towards the two machines 4, respectively, for automatically packing articles into protective bags made for instance from cellophane.

The plant according to FIG. 4 will be described more in detail by reference to FIGS. 5 to 12, for simplicity describing the use of robot 3 gripping the molded articles and conveying them toward packing machine 4.

The plasticizing-injection machine 1 (FIG. 4) is broadly known per se and need not be described in detail. It allows molten material to be injected into mold 2 which has a vertical partition plane. In FIG. 5, mould 2 is illustrated in the open position showing the various horizontal cavities 5 of part 6 of mold 2. Horizontal cavities 5 correspond to the shapes of the articles to be molded, table forks in FIG. 5. By way of example, twenty cavities 5 may be provided and arranged in two rows of ten aligned cavities. Each cavity 5 comprises an impression portion 5a corresponding, for example, to a fork and another rectangular impression 5b communicating with the impression 5a through channels or ducts narrowing or restricting part 6 of mold 2. Each impression 5 thus allows a fork 7 (see FIG. 1) to be molded. The prongs of fork 7 have their tips connected by frangible hammered-out portions 8, respectively, to a protecting plate 9 manually separable or severable from the fork 7 by breaking the hammered-out portions 8. The provision of the protecting plate 9 would provide sanitary assurances by evidencing that the fork has not been previously used.

Referring to FIG. 5, robot 3 is diagrammatically shown as comprising a vertical pivoting column 10 carrying an arm 11 with a gripping wrist 12 which may pivotally swivel in all the directions in space as already known per se.

According to a first embodiment, wrist 12 of robot 3 comprises parallel gripping rods 13 adapted to be positioned between both parts 6 of the open mold 2 in confronting relation to or opposite circular openings 14 in the protecting plates 9, obtained when molding the forks 7. In this position, the rods 13 extend at right angles to the part 6 of the mold 2 carrying the molded forks. Preferably, each protective plate 9 comprises two vertically aligned openings or holes 14 when each fork 7 is located within its impression and which are likely to be engaged by two gripping rods 13 of the wrist 12. For the sake of simplicity, only one set of overlying rods 13 has been shown for gripping two forks, respectively, it being understood that in the actual case there are provided as many pairs of rods 13 as there are pairs of openings or holes 14.

The manner according to which the various molded forks are gripped is performed as follows.

Once the forks 7 and their associated protective plates 9 have been molded, the opening of the mold 2 is operated and the robot 3 would pivot or slew about its vertical axis so as to bring its wrist 12 between both parts 6 of the mold 2. The robot 3 would position the wrist 12 so that the gripping rods 13 be accurate in confronting registering relationship with, and very close to, the openings 14 of the plates 9. When the gripping rods 13 are properly positioned, the ejectors 15 of the mold 2 are actuated simultaneously so as to eject the forks 7 from their impressions 5, which are then threaded simultaneously onto their gripping rods 13, respectively. The forks 7 are thus gripped separately by the rods 13 and maintained thereon horizontally. The robot 3 would then disengage the wrist 12 from between both parts 6 of the mold 2 for conveying the gripped forks towards the packing machine 4 (see FIG. 10).

According to a second embodiment shown in FIGS. 7 and 11, the wrist 12 of the robot 3 comprises a number of nippers 16, only one of which is shown for the sake of simplicity and which may simultaneously grasp the forks 7. For that purpose, each fork 7 comprises a molded protrusion 17 formed on the outer face of the protecting plate 9. Each protrusion 17 may be grasped by a nipper 16 and may be either vertical or horizontal depending upon whether the corresponding gripping nippers 16 have their two arms extending in a horizontal or vertical plane. For gripping the molded forks, the robot 3 would position its wrist 12 so that the nippers 16 grip round the protrusions 17, respectively, before the ejection of the forks from their impressions 5 is carried out. Once these forks 7 have been gripped, the robot 3 would carry them toward the packing machine 4 (see FIG. 10).

It is possible to use only a single robot 3 for gripping the molded forks when the prescribed production rate is relatively small. However, in the case of a high production rate, it is preferable to use two robots 3. In the latter case, one robot would convey one gripped group of forks towards the packing machine 4 while the other robot would carry out an operating step of gripping another group of molded forks. For reasons related to the production rate it is also desirable that the gripped forks be not directly brought to the packing machine 4 but conveyed to a storage station located near the machine 4 where they are recovered by a third gripping robot laying them down in lines or rows, respectively, onto aligned transport pallets 18 (FIG. 10) which are stationary with respect to one another and carried along or driven longitudinally for instance by a transmission chain or belt 19 powered or moved by an electric motor. When passing underneath a cellophane paper strip or web 20, each fork 7 is automatically wrapped in by a cellophane paper strip to form a protective bag S. The machine 4, and more particularly the means allowing the forks to be conditioned into protective bags 5, are widely known. Once the forks have been conditioned, they would pass below a device adapted for welding, for instance heat-sealing by ultrasound or high frequency, one portion of the cellophane paper of the bag onto the protective plate 9. The welding or heat-sealing apparatus is also known per se and may be an integral part of machine 4. The welding or sealing of the protective bag to plate 9 would compel the consumer at first to separate or sever plate 9 from the fork 7 before taking the latter out of its bag so that the plate 9 would fall inside of the bag. This may reduce pollution of the environment by the severed plates 9 and especially reduces litter on the tables of restaurants and hospital departments using the articles.

The device according to the invention has been described with reference to forks as molded articles but it should be understood that it is applicable also to knives 21, the cutting edges of which are protected by a strip 22 having a shape mating with or complementary to that of the cutting edge and connected thereto by two or more frangible connections 23. Each strip 22 may comprise, for example, two openings 24 horizontally aligned when the knife 21 is in a horizontal position in its mold 2 and co-operating with two parallel rods 13, respectively, of wrist 12 of robot 3. Alternatively, strip 22 could be molded to include a protrusion analogous to protrusion 17 of fork 7 of FIG. 7. Such protrusion would be grippable, for example, by the robot of FIG. 11. Moreover, the articles to be gripped have been shown as assuming a horizontal position in their manufacturing mold 2, but it is obvious that they may assume a vertical position. Protective plates 9 may, in blocking access to sharp portions of the utensil, have shapes other than rectangular.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An article of manufacture comprising a food utensil having at least one sharp region and further having a protecting member frangibly joined to said sharp region wherein said protecting member blocks access to said sharp region, and wherein said article further includes a protective bag surrounding said article and welded to said protecting member.

2. The article of claim 1, wherein said utensil is a hors d'oeuvre skewer, wherein said protecting member is ball-shaped, and wherein said protecting member is frangibly joined to a sharp end of said hors d'oeuvre skewer by a narrowed section extending from said ball-shaped member to the sharp end of said hors d'oeuvre skewer.

3. The article of claim 1, wherein said food utensil is a fork having a plurality of prongs, and wherein a protecting member is a flat strip having a number of protrusions therefrom equivalent to the number of prongs on said fork wherein each protrusion is frangibly joined to a tip of a prong of said fork.

4. The article of claim 1, wherein said article is a knife having a sharp edge, said protecting member is a strip having substantially the same length as said sharp edge of said knife, wherein said protecting member has at least one protruding member which frangibly joins said sharp edge of said knife.

5. The article of claim 1, wherein an article is manufactured as a single integral piece by a technique selected from the group consisting of injection molding and compression molding.

6. The article of claim 1, wherein said article is entirely made of a single plastic material.

* * * * *